United States Patent
Hulbert et al.

(10) Patent No.: US 7,589,662 B1
(45) Date of Patent: Sep. 15, 2009

(54) SYNTHETIC APERTURE RADAR SYSTEMS AND METHODS

(75) Inventors: Douglas S. Hulbert, San Diego, CA (US); Ayax D. Ramirez, Chula Vista, CA (US); Stephen D. Russell, San Diego, CA (US); Randy L. Shlmabukuro, Kapolei, HI (US); Mark W. Roberts, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 124 days.

(21) Appl. No.: 11/765,557

(22) Filed: Jun. 20, 2007

(51) Int. Cl.
*G01S 13/00* (2006.01)
(52) U.S. Cl. .................. 342/25 R; 342/74; 342/89; 342/104; 342/133
(58) Field of Classification Search ............... 342/25 R, 342/74, 89, 104, 133
See application file for complete search history.

(56) References Cited

U.S. PATENT DOCUMENTS

| | | | |
|---|---|---|---|
| 3,487,462 | A | 12/1969 | Holberg |
| 3,812,493 | A | 5/1974 | Afendykiw et al. |
| 4,246,580 | A | 1/1981 | Caputi, Jr. |
| 4,325,065 | A | 4/1982 | Caputi, Jr. |
| 4,370,656 | A * | 1/1983 | Frazier et al. ............... 342/458 |
| 4,456,862 | A | 6/1984 | Yueh |
| 5,113,193 | A * | 5/1992 | Powell et al. .............. 342/25 F |
| 5,961,568 | A * | 10/1999 | Farahat ........................ 701/120 |
| 6,204,799 | B1 | 3/2001 | Caputi, Jr. |
| 6,608,584 | B1 | 8/2003 | Faulkner |
| 7,277,042 | B1 * | 10/2007 | Cho et al. .................. 342/25 F |
| 2003/0151540 | A1 | 8/2003 | Faulkner |

OTHER PUBLICATIONS

Baniak, Jonathan; Baker Gregory; Cunningham, Ann Marie; Maring, Lorraine; Lockheed Martin Mission Systems, Silent Sentry(Tm) Passive Surveillance, Jun. 7, 1999.
Wu, Yong; Munson, Jr. David C.; Multistatic Synthetic Aperture Imaging of Aircraft using Reflected Television Signals; Algorithms for Synthetic Aperture Radar Imagery VIII, Edmund G. Zelnio, Editor; Proceedings of SPIE vol. 4382 (2001).

* cited by examiner

*Primary Examiner*—Thomas H Tarcza
*Assistant Examiner*—Timothy A Brainard
(74) *Attorney, Agent, or Firm*—Kyle Eppele; Peter A. Lipovsky; J. Eric Anderson

(57) ABSTRACT

A method of determining a radar receiver path, comprising the steps of: obtaining a transmitter position; obtaining a target position and velocity; obtaining a radar receiver position and velocity; determining a transmitter aspect angle gradient, a transmitter aspect angle time derivative and a transmitter co-state vector time derivative; determining a target aspect angle gradient, a target aspect angle time derivative and a target co-state vector time derivative; generating a radar platform heading variable, and a group of differential variables over a defined time span; inputting the group of differential variables into a differential equation solver; receiving a group of possible headings for the radar receiver path; and finding an optimum radar receiver path from the group of possible headings.

21 Claims, 3 Drawing Sheets

SYNTHETIC APERTURE RADAR SYSTEMS AND METHODS

FEDERALLY-SPONSORED RESEARCH AND DEVELOPMENT

This invention (Navy Case No. 84482) was developed with funds from the United States Department of the Navy. Licensing inquiries may be directed to Office of Research and Technical Applications, Space and Naval Warfare Systems Center, San Diego, Code 2112, San Diego, Calif. 92152; telephone (619) 553-2778; email: T2@spawar.navy.mil.

BACKGROUND OF THE INVENTION

1. Field of the Invention

The present invention relates generally to synthetic aperture radar. More specifically, but without limitation thereto, the present invention relates to optimization of synthetic aperture radar image formation.

2. Description of the Related Art

In monostatic synthetic aperture radar (SAR), the transmitting and receiving antennas share common hardware or a common platform. In bistatic or multistatic SAR, the transmitting and receiving antennas are distinct and at least one component can move along a path independent of the others. In military applications, a potential advantage of the data collection geometry of multistatic SAR lies in the ability of a high powered transmitter to operate at a safe distance from targeted scenes of interest while covert receivers fly closer.

Bistatic SAR is a process of generating an image by combining the magnitude and phase measurements of many spatially distributed locations of an illuminator and/or a receiver. In bistatic SAR, measurements are generally compensated for illuminator location and motion, reflective surface location, and receiver location and motion. Phase compensation is generally performed for each fast-time and slow-time sampling of the measured signals. The phase compensation coefficients can be determined accurately when the location and motion of the illuminator and receiver are accurately known. Unlike monostatic SAR where the illuminator and receiver are co-located, this information is difficult to accurately obtain in bistatic SAR making it difficult to align the two separate reference systems of a bistatic SAR system. As a result, the generation of quality images in a bistatic SAR is difficult.

Conventional bistatic and multistatic SAR imaging systems have used a data-link between the illuminator and receiver to communicate the location and motion information. This approach increases the complexity of such systems and furthermore, has several inherent difficulties and risks. For example, maintaining a data link in a real-time operational environment may be difficult due to interfering and jamming signals resulting in an inability to generate a quality image. It may also give away the location of the illuminator or receiver and may require that the receiver and illuminator be within line-of-site depending on the frequency. Thus there is a general need for an improved method and system for generating of a bistatic or multistatic SAR image.

Figure 1:
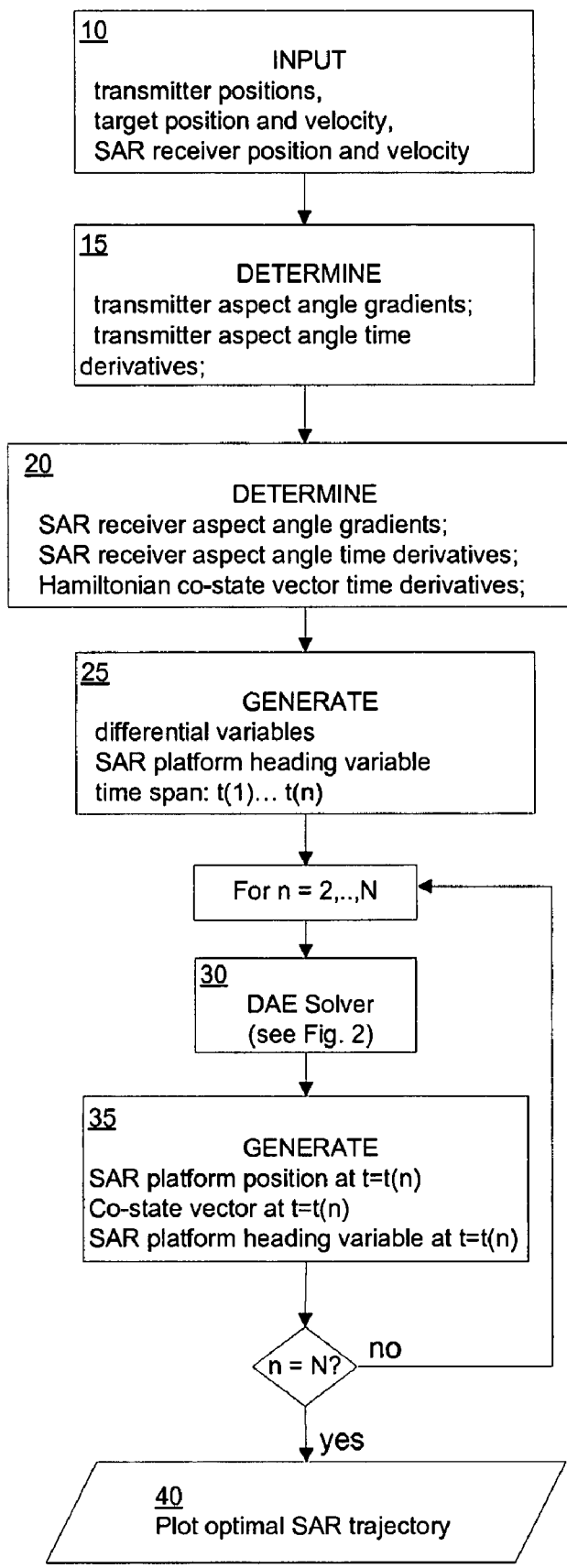
FIG. 1 is a flowchart illustrating one embodiment of an Optimal SAR Receiver Path algorithm.

It will be recognized that some or all of the Figures are schematic representations for purposes of illustration and do not necessarily depict the actual relative sizes or locations of the elements shown. The Figures are provided for the purpose of illustrating one or more embodiments of the Optimal SAR Receiver Path algorithm with the explicit understanding that they will not be used to limit the scope or the meaning of the claims.

DETAILED DESCRIPTION OF THE EMBODIMENTS

In the following paragraphs, the Optimal SAR Receiver Path algorithm will be described in detail by way of example with reference to the attached drawings. While the Optimal SAR Receiver Path algorithm is capable of embodiment in many different forms, there is shown in the drawings and will herein be described in detail specific embodiments, with the understanding that the present disclosure is to be considered as an example of the principles of the Optimal SAR Receiver Path algorithm and not intended to limit the Optimal SAR Receiver Path algorithm to the specific embodiments shown and described. That is, throughout this description, the embodiments and examples shown should be considered as exemplars, rather than as limitations on the Optimal SAR Receiver Path algorithm.

Embodiments of the Optimal SAR Receiver Path algorithm and associated methods (hereafter "OSRP") employs an algorithm and methods to determine the best trajectory, or equivalently in the case of constant-speed receiver platforms, time-tagged heading sequences, to fly to get a good SAR image of a target of interest. In addition, the OSRP provides methods to predict the quality of images produced from synthetic apertures using multiple transmission frequencies. These methods provide a tactical decision aid to exploit ambient, commercial radio or television transmissions as illumination to create useful images of target aircraft. OSRP methods described herein predict trajectories, or heading sequences for mobile SAR platforms to collect data for optimal image formation and estimate the quality of those images beforehand. In other words, the methods described herein perform a cost/benefit analysis in real time, both for advanced planning and for airborne targets of opportunity.

For example, in one embodiment the OSRP algorithm determines an ideal radar receiver path to obtain a target image. One or more transmitter positions are obtained. A target position, velocity, estimated trajectory and a radar receiver initial position and initial velocity are also obtained. An optimal receiver path for data collection is determined, and a figure of merit for the image quality induced by the receiver path is generated as well. After obtaining other initial positions and velocities for the radar receiver, the algorithm generates a rating list for various paths of the radar receiver, and the path that obtains the best quality image is selected.

Several of the OSRP methods described below for passive image formation also apply to the case of active multistage image formation. The methods may be applied in the placement of stationary receivers and/or transmitters, perhaps in the area of special operations or homeland defense. The OSRP methods described herein may also be applied to assign trajectories to maneuvering receivers and/or transmitters, as in the deployment of unmanned aerial vehicles (UAV) operating as components of a multistatic SAR system.

One example of conventional analytical work in bistatic SAR identifies methods to compute measures of image quality, such as resolution, as a function of transmitter and receiver locations over the course of data collection. However, embodiments of the OSRP described herein produce answers to questions involving the inverse relation of these quantities. That is, the OSRP generates flight paths of SAR receiver platforms to generate images of an airborne target, or reflector that will meet a prescribed value of a specific image quality metric (i.e., a standard of measurement).

In a conventional monostatic spotlight-mode synthetic aperture radar (SAR) system, range samples are collected at each of a set of look angles as the antenna is slewed to keep its bore sight in line with the center of a scene of interest (the line between the transmit antenna and the scene center defines the look angle in the terrestrial reference frame). When a Fourier transform is applied to the set of range samples taken at one look angle (where platform motion during the range sampling of one transmit pulse is not modeled as a change in look angle), the result constitutes a set of values of the two-dimensional Fourier transform of the image to be constructed, evaluated along the look angle, now understood as a line in the Fourier plane. As sets of range returns for multiple look angles are Fourier-transformed and stored, the two-dimensional Fourier transform of the image is approximated. Typically, the final image is constructed via inverse two-dimensional Fourier transforms after the approximation of the two-dimensional Fourier transform, assembled earlier, has been interpolated onto a grid of ordered pairs in the Fourier plane compatible with computational requirements of the inverse two-dimensional Fourier mapping.

In conventional bistatic SAR, there is also a line that maps into the Fourier plane, but it is no longer a look angle from either the transmit antenna to the scene center nor the look angle from the receive antenna to the scene center. The new line, however, is defined by the bisector of these two look angles.

However, phase errors are introduced into the data collection process by uncertainty in the start time for waveform demodulation. In conventional monostatic SAR, the main source of this uncertainty lies in imprecise knowledge of the location of the SAR platform. In conventional bistatic SAR, errors are compounded by two other factors: uncertainty in the location of a second platform, and uncertainty in the difference between the platforms' time references.

Embodiments of the OSRP described herein provide decision tools for planning optimal flight paths. That is, the ideal flight path for SAR system components, such as the transmitter and receiver located on an airborne platform, during data collection are provided, enabling generation of the best possible SAR image.

Generally, the OSRP algorithm generates SAR receiver collection paths (or equivalently, in the case of substantially constant-speed receiver platforms, time-tagged sequences of headings) by solving a set of Hamiltonian Equations. The equations form a Differential Algebraic Equation (DAE) of index 1 that can be solved using commercial software packages such as MATLAB® (a data-manipulation software package manufactured by The Mathworks Company of Natick, Mass.). For example, located below is an exemplary computer program of the OSRP algorithm in MATLAB, as a function titled OSRP (Optimal SAR Receiver Path) Algorithm.

The OSRP algorithm employs Hamiltonian equations that are first-order ordinary differential equations, and are generally used, among other areas, in what is known to those skilled in the art as "control theory." A set of Hamiltonian state and co-state equations are generated. Co-state equations are related to the state equations. The co-state equations are stated as a vector of first order differential equations that include the vector of partial derivatives of the negative of the Hamiltonian with respect to the state variables. The co-state variables can be interpreted as Lagrange multipliers associated with the state equations. The state equations represent constraints of the minimization problem in control theory, and the co-state variables represent the marginal cost of violating those constraints. The state equations are subject to an initial condition and are solved forwards in time. The co-state equations satisfy a terminal condition and are solved backwards in time, from the final time towards the beginning. In the exemplary computer program of the OSRP below, however, the independence of the control variable with respect to the state variables allows a formulation in which both the state equations and the co-state equations can be solved forwards in time.

The state and co-state variables that satisfy the respective state and co-state equations denote the optimal state and co-state trajectories. Then, the Pontryagin Maximum Principle is applied: Along the optimal state and co-state trajectories, the choice of an optimal control variable determined at a series of discrete time periods results in the determination of a group of local maximums for the Hamiltonian equations. The group of local maximums determines an optimum SAR receiver trajectory that will generate the best possible SAR image. In the exemplary computer program of the OSRP below, the independence of the control variable with respect to the state variables allows for a slightly simpler approach for the Pontryagin Maximum Principle. In particular, the state variables and co-state variables can be integrated forward in time, with the Pontryagin Maximum Principle employed at each time step to choose a new, optimal value of the "algebraic" control variable, realized as a local maximum, over a small set of arguments. The values of the arguments are refreshed at each time step.

Figure 2:
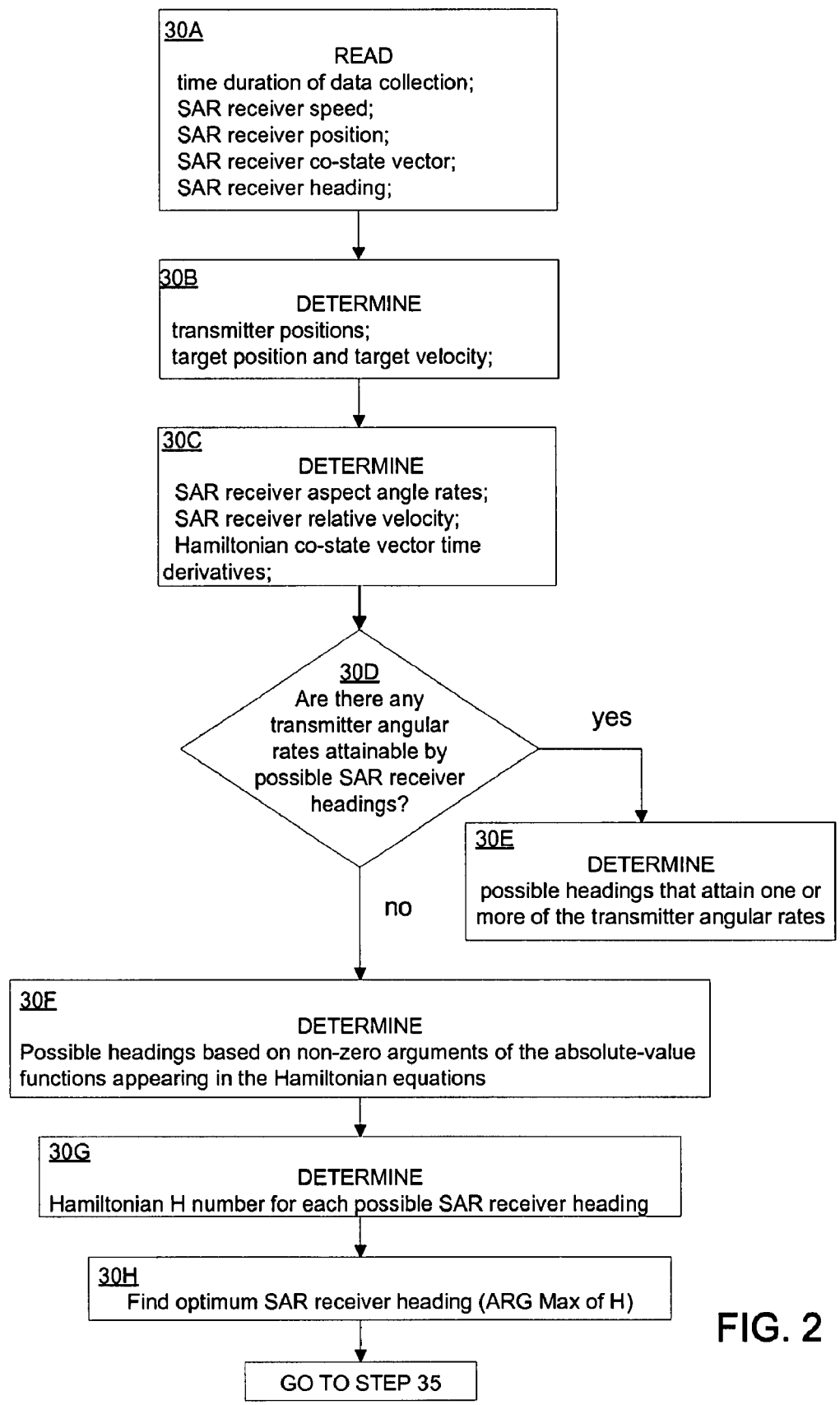
FIG. 2 is a flowchart illustrating one portion of the embodiment of the Optimal SAR Receiver Path algorithm illustrated in FIG. 1.

Referring now to FIGS. 1 and 2, one embodiment of an OSRP method in the form of flowcharts for choosing an optimal SAR receiver flight path is illustrated. In step 10, the transmitter positions; as well as the target position and velocity; and the SAR receiver platform position and velocity are input into the OSRP algorithm.

In step 15, the OSRP algorithm determines the transmitter aspect angle gradients and the transmitter aspect angle time derivatives, which are used to determine the Hamiltonian co-state vector time derivatives. The transmitter aspect angle is the relative angle between the transmitter and the target. Transmitter aspect angle gradients are the spatial rate of change of the relative angle between the transmitter and the target.

In step 20, the OSRP algorithm determines the SAR receiver platform aspect angle gradients and the SAR receiver platform aspect angle time derivatives, which are used to determine the Hamiltonian co-state vector time derivatives. The SAR receiver platform aspect angle is the relative angle between the path of the target, and the path of the SAR receiver platform. Aspect angle gradients are the spatial rate of change of the relative angle between the target and the SAR receiver platform. The SAR receiver aspect angle time derivatives are also used to determine the derivatives with respect to time of the Hamiltonian co-state vectors.

In step 25, the OSRP algorithm determines initial values for the differential variables, the SAR platform heading variable and a time span for analysis. These quantities constitute a complete vector of initial values for a Differential Algebraic Equation ("DAE") that is input into a DAE solver in step 30.

FIG. 2 illustrates a flowchart of one embodiment of the DAE solver employed in the OSRP algorithm in step 30 of FIG. 1. The DAE solver generates time derivatives for four (4) differential variables for one time step. That is, in step 30A, the OSRP algorithm accepts, or reads four parameters as initial conditions for the DAE solver and constructs another segment of the optimal path from them: 1) the current time within the data collection interval; 2) the current SAR receiver speed and heading; 3) current SAR receiver position; and 4) the current SAR receiver co-state vector.

In step 30B, the transmitter position, or positions, in the case of more than one transmitter are determined, and the target position and target velocity are determined.

In step 30C, the SAR receiver aspect angle rates, SAR receiver relative velocity to the target and the SAR receiver co-state vector time derivatives are determined. The SAR receiver aspect angle is the relative angle between the path of the moving target, and the path of the SAR receiver platform. SAR receiver aspect angle rates are the rate of change of the relative angle between the path of the moving target, and the path of the SAR receiver platform.

In step 30D, the DAE solver determines if there are any transmitter angular rates attainable by possible SAR receiver headings. If there are, in step 30E the DAE solver determines possible headings that attain one or more of the transmitter angular rates. In the case where there are no transmitter angular rates attainable by possible SAR receiver headings, then in step 30F the DAE solver determines possible headings based on non-zero arguments of the absolute-value functions appearing in the Hamiltonian equations.

In step 30G, the Hamiltonian H number for each possible SAR receiver heading is determined. The Hamiltonian H number is a rating of the estimated quality of the image that would be generated by the SAR receiver. The higher the rating number, the higher the quality of the SAR image.

In step 30H the optimum SAR receiver heading is determined. The optimum SAR receiver heading is the heading that results in the best quality SAR image. That is, the optimum SAR receiver heading is the heading that receives the highest Hamiltonian H number, which is the ARG MAX Hamiltonian H number.

Referring back to FIG. 1, in the final conditional sub-step of step 30 the DAE solver increments to the next time period and generates time derivatives for four (4) differential variables for the next time step. That is, before looping back to the beginning of step 30, the OSRP algorithm accepts, or reads four parameters as the next conditions for the DAE solver and constructs another segment of the optimal path from them: 1) the current time duration within the data collection interval; 2) the current SAR receiver speed and heading; 3) current SAR receiver position; and 4) the current SAR receiver co-state vector. This process is repeated until all the time increments of interest are analyzed.

In step 40 the optimal SAR heading determined in steps 10-35 is plotted and in one embodiment, may be visually presented to a pilot to be used for course headings for an airborne SAR platform, or input into an autopilot for use in an autonomous unmanned aerial vehicle having SAR equipment.

Figure 3:
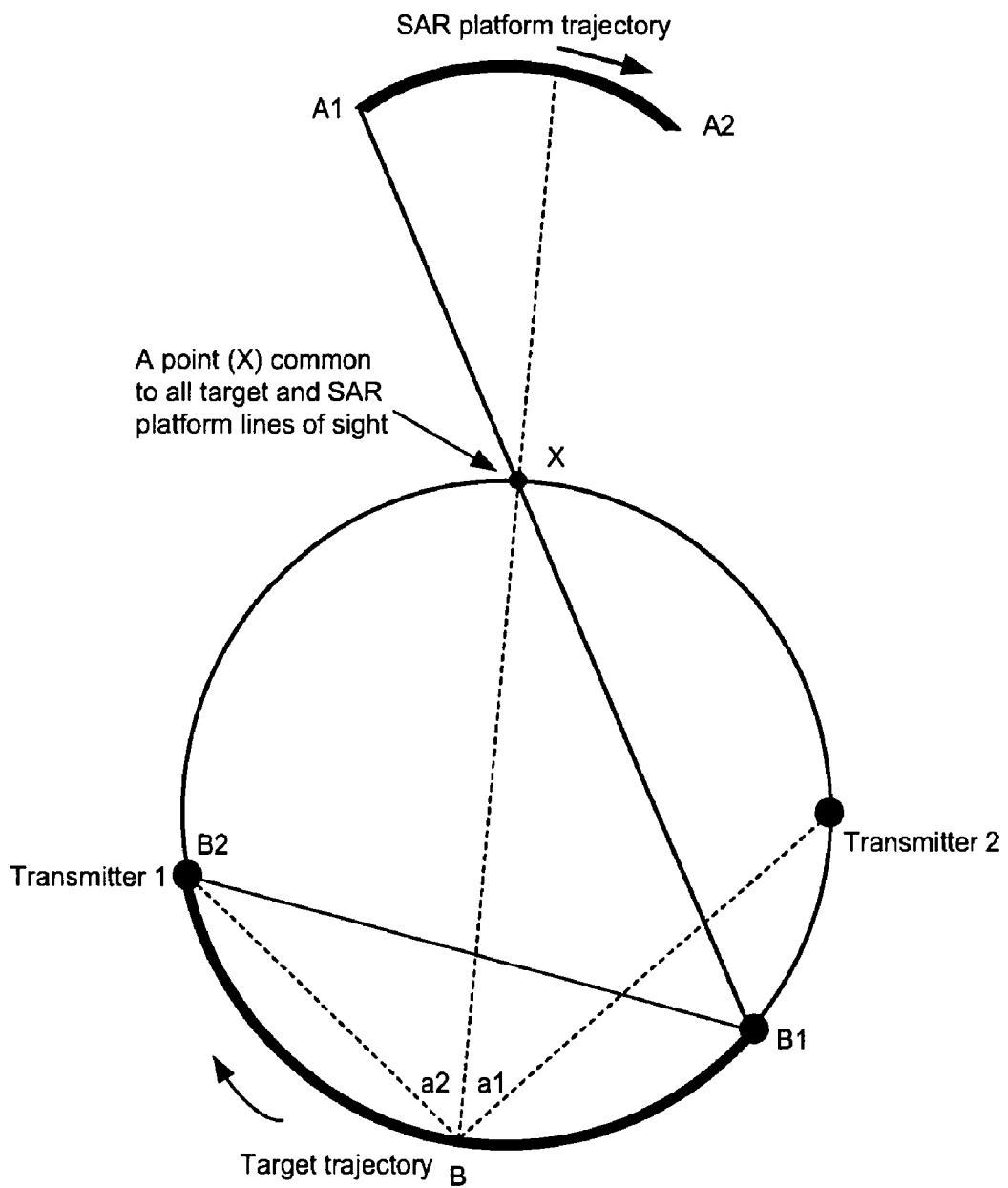
FIG. 3 illustrates arc A1-A2, which one example of an output from the Optimal SAR Receiver Path algorithm illustrated in FIGS. 1 and 2.

As shown in FIG. 3, one example of an output from the Optimal SAR Receiver Path algorithm illustrated in FIGS. 1 and 2 is presented. This example has been constructed so that the location of optimal paths can be inferred from geometrical reasoning, and compared with outputs of the Optimal SAR Receiver Path algorithm. However, it will be appreciated that other paths may be generated by the Optimal SAR Receiver Path algorithm.

In FIG. 3, the fixed transmitter locations Transmitter 1 and Transmitter 2 form antipodes of a circle, while the point X is equidistant from the transmitter locations. Point X is the point common to all target-to-SAR receiver platform lines of sight over the course of any optimal receiver paths. During data collection, the transmitter locations remain fixed, X remains fixed, while the target, starting at position B1, moves along the arc (shown by a heavy line), and ending at position B2. From the geometry of angles subtended within the circles, the angles at point B1 (that is, from transmitter 2 to position B1 to point X and from transmitter 1 to position B1 to point X) each remain fixed at 45 degrees over the course of the trajectory, such as the angles a1 and a2 (shown by the dashed lines) when the target is at point B.

Therefore point X, considered as a stationary path, forms an optimal receiver location for data collection, as the half-angles during data collection remain constant at 22.5°, maintaining an optimal variation of zero. In addition, any SAR receiver trajectory that can maintain the same target-to-X aspect angle over the course of data collection will also keep the variation at zero. If the target covers its trajectory at constant speed, the constant-speed SAR receiver paths that form reflections, through the point X, of the target trajectory, also keep the variation at zero. One embodiment of the Optimal SAR Receiver Path algorithm may display the SAR platform trajectory (shown as path A1-A2) in the form of latitude and longitude coordinates, or the output from the Optimal SAR Receiver Path algorithm may be fed directly to an autopilot that controls the heading of a SAR receiver platform.

The following discussion is intended to provide a brief, general description of a suitable computing environment in which the Optimal SAR Receiver Path algorithm may be implemented. Although not required, the Optimal SAR Receiver Path algorithm as described above is described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the Optimal SAR Receiver Path algorithm may be practiced with other computer system configurations, including hand-held devices, multiprocessor systems, microprocessor-based or programmable consumer electronics, network PCs, mini-computers, mainframe computers, and the like. The Optimal SAR Receiver Path algorithm may also be practiced in distributed computing environments where tasks are performed by remote processing devices that are linked through a communications network. In a distributed computing environment, program modules may be located on both local and remote memory storage devices.

As will be appreciated by one of skill in the art, embodiments as described above may be provided as methods, systems, or computer program products. Accordingly, embodiments of the Optimal SAR Receiver Path algorithm may take the form of an entirely software embodiment or an embodiment combining software and hardware aspects. Furthermore, embodiments of the Optimal SAR Receiver Path algorithm may take the form of a computer program product which is embodied on one or more computer-usable storage media (including, but not limited to, disk storage, CD-ROM, optical storage, flash memory storage, and so forth) having computer-usable program code embodied therein.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowcharts illustrated in FIGS. 1 and 2.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions described above.

Thus, it is seen that a computer program for finding the Optimal SAR Receiver Path is provided. For example, the following is an exemplary computer program of the Optimal SAR Receiver Path algorithm in MATLAB, as a function titled OSRP (Optimal SAR Receiver Path) Algorithm.

The OSRP Algorithm

This section presents a MATLAB implementation of the Optimal SAR Receiver Path Algorithm:

MANAGER FOR THE INITIAL VALUE SOLVER

```
k1 = 50;
r0 = 1; m1 = [-r0 0]';
% (r,mu) are polar coordinates for the receiver, centered at (0,r0)
mu_zero = pi/2 + pi/8;
mu_dot = -pi/4;
r = r0;
phi_0 = -pi/4; phi_dot = -pi/2;
v0 = r0 * [cos(phi_0) sin(phi_0)]';        % initial reflector position
dvdt_0 = r0 * [-sin(phi_0) cos(phi_0)]' * phi_dot; % initial
reflector velocity
y_position_initial = [0 r0]' + r*[cos(mu_zero) sin(mu_
zero)]'; % initial receiver position
y_velocity_initial = r*[-sin(mu_zero) cos(mu_zero)]'*mu_
dot; % initial receiver velocity
theta_initial = atan2(y_position_initial(2) - v0(2), y_
position_initial(1) - v0(1));
velocity_wrt_rflctr = y_velocity_initial - dvdt_0;
% initial receiver velocity wrt the reflector
rcvr_from_rflctr = y_position_initial - v0;
norm1 = norm(rcvr_from_rflctr); % initial range of reflector from the receiver
theta_dot_initial = (velocity_wrt_rflctr(2)*rcvr_from_rflctr(1) - ...
   velocity_wrt_rflctr(1)*rcvr_from_rflctr(2))/norm1/norm1; % initial theta dot (a cross product)
% Computations to initialize the lamda dots
m1 = [-r0 0]';   m2 = [r0 0]'; % transmitter positions
f1 = 1; f2 = 1;         % transmitter operating frequencies
beta1 = atan2(m1(2) - v0(2), m1(1) - v0(1));
beta2 = atan2(m2(2) - v0(2), m2(1) - v0(1)); % aspect angles wrt the reflector
beta = [beta1 beta2]';
% beta1_dot = -dvdt(1)*(m1(2) - v(2)) + dvdt(2)*(m1(1) - v(1));
beta1_dot = 0.5*phi_dot
% beta2_dot = -dvdt(1)*(m2(2) - v(2)) + dvdt(2)*(m2(1) - v(1));
beta2_dot = 0.5*phi_dot;
beta_dot = [beta1_dot beta2_dot]';
S = rcvr_from_rflctr(2)/norm1/norm1;
C = rcvr_from_rflctr(1)/norm1/norm1;
grad_theta = [-S;C];
hess_theta = [2*C*S (-C*C + S*S); (-C*C + S*S) -2*C*S]; % 2-by-2 Hessian of theta wrt y1,y2
grad_theta_dot = hess_theta*velocity_wrt_rflctr; % 2-by-1
u = sin(0.5*(theta_initial-beta)).*(theta_dot_initial - beta_dot); % argument to be used below
Fsgn_coeff = Fsgn_prime(k1,u).*u + Fsgn(k1,u); % has length = no. of xmtrs
coeff_1 = sum(0.5.*[f1 f2]'.*Fsgn_coeff.*(0.5*cos(0.5*(theta_initial-beta))).*(theta_dot_initial - beta_dot));
coeff_2 = sum(0.5.*[f1 f2]'.*Fsgn_coeff.*sin(0.5*(theta_initial - beta)));
% after summing, create a 2-by-1 vector for F(t,y(3:4))
lamda derivs = coeff_1*grad_theta + coeff_2*grad_theta_dot;
delta_t = 0.001;
t = 0:delta_t:1.5;
rho = 10000;
% INITIALIZE THE 5-BY-1 STATE VECTOR
y_0 = zeros(5,1);       % initial state vector
y_0(1:2) = y_position_initial;
y_0(3:4) = rho*lamda_derivs';
y_0(5) = pi/8;
U = zeros(length(t),5,5); % third dimension is for varying speeds
H = zeros(length(t),1);
for k = 1:5 % this loop prepares the initial conditions for varying initial speeds
    y_velocity_initial = (1 + (k-3)/16)*r*[-sin(mu_zero) cos(mu_zero)]'*mu_dot; % initial receiver velocity
    velocity_wrt_rflctr = y_velocity_initial - dvdt_0; % initial receiver velocity wrt the reflector
```

-continued

MANAGER FOR THE INITIAL VALUE SOLVER

```
    lamda_derivs = coeff_1*grad_theta + coeff_2*(hess_theta*velocity_wrt_rflctr);
    y_0(3:4) = rho*lamda_derivs'; % the other entries don't change with k
    U(1,1:5,k)= y_0';
end
% speed_in = abs(r*mu_dot);
for k =1: 5
                    speed_in = (1 + (k-3)/16)*abs(r*mu_dot);
                        for n = 2:length(t)
    fty = fty11(t(n-1),U(n-1,1:5,k),speed_in);
    U(n,1:4,k) = U(n-1,1:4,k) + delta_t.*fty(1:4)'; % increment position and costate vector lamda
    U(n,5,k) = fty(5); % update heading, the "algebraic" variable
            %       H(n,1) = [U(n,3) U(n,4)]*[speed_in*cos(fty(5)) speed_in*sin(fty(5))]'- U(n,6);
        % H is the Hamiltonian
                        end
end
figure;
axis([-1 1 1 3]);
hold on;
rad = r0*(1+([1 2 3 4 5]'-3)/16);
range=linspace(5*pi/8,2*pi/8,30);
plot((rad*cos(range))',(r0+rad*sin(range))');
axis equal;
X = squeeze(U(:,1,:)); Y = squeeze(U(:,2,:));
plot(X,Y);
% for k = 1:5
%                   plot(U(:,1,k),U(:,2,k),'k');
% end
% figure;
% plot(H(:,1));
figure;
% plot whole circle that has two transmitters as end points
range1 = linspace(0,2*pi,1000);
plot(cos(range1), sin(range1));
axis equal;
hold on;
plot(1,0,'r*',-1,0,'r*');
plot(cos(range1(625:875)),sin(range1(625:875)),'MarkerSize',8);
    INITIAL VALUE DAE SOLVER
    function efty = fty10(t,y,speed)
delta_t = 0.001; % import the time step to extrapolate lamdas for a better y(S) estimate
k1 = 50;
efty = zeros(5,1); % column vector
r0 = 1; m1 = [-r0 0]';m2 = [r0 0]';    % transmitter positions
f1 = 1;f2 = 1;           % transmitter operating frequencies
phi_0 = -pi/4;           % initial reflector angle wrt the origin
phi_dot = -pi/2;         % angular rate of the reflector about the origin
phi = phi_0 + phi_dot*t';           % reflector angle wrt the origin
v = r0 * [cos(phi) sin(phi)]';       % reflector position
dvdt = r0 * [-sin(phi) cos(phi)]'* phi_dot; % reflector velocity
theta = atan2(y(2) - v(2), y(1) - v(1)); % bearing of rcvr wrt the reflector
beta1 = atan2(m1(2) - v(2), m1(1) - v(1));
beta2 = atan2(m2(2) - v(2), m2(1) - v(1));
beta = [beta1 beta2]';
% beta1_dot = -dvdt(1)*(m1(2) - v(2)) + dvdt(2)*(m1(1) - v(1));
beta1_dot = 0.5*phi_dot;
% beta2_dot = - dvdt(1)*(m2(2) - v(2)) + dvdt(2)*(m2(1) - v(1));
beta2_dot = 0.5*phi_dot;
% these rates assume a unit radius for the reflector
rcvr_from_rflctr = [y(1) y(2)]'- v;
norm1 = norm(rcvr_from_rflctr); % ||y(1:2) - v||
beta_dot = [beta1_dot beta2_dot]';
S = (y(2) - v(2))/norm1/norm1;
C = (y(1) - v(1))/norm1/norm1;
grad_theta = [-S;C];
hess_theta = [2*C*S (-C*C + S*S); (-C*C + S*S) -2*C*S]; % 2-by-2 Hessian of theta wrt y1,y2
velocity = speed*[cos(y(5)) sin(y(5))]';
velocity_wrt_rflctr = velocity - dvdt;
theta_dot = (rcvr_from_rflctr(1)*velocity_wrt_rflctr(2) - ...
    rcvr_from_rflctr(2)*velocity_wrt_rflctr(1))/norm1/norm1;
grad_theta_dot = hess_theta*velocity_wrt_rflctr; % 2-by-1
u = sin(0.5*(theta-beta)).*(theta_dot - beta_dot); % argument to be used below
Fsgn_coeff = Fsgn_prime(k1,u).*u + Fsgn(k1,u); % has length = no. of xmtrs
dot_diffs = theta_dot - beta_dot;
cos_diffs = cos(0.5*(theta-beta));
sin_diffs = sin(0.5*(theta-beta));
coeff_1 = sum(0.5.*[f1 f2]'.*Fsgn_coeff.*0.5.*cos_diffs.*dot_diffs);
coeff_2 = sum(0.5.*[f1 f2]'.*Fsgn_coeff.*sin_diffs);
```

-continued

MANAGER FOR THE INITIAL VALUE SOLVER

```
% after summing on the xmtr index, create a 2-by-1 vector for F(t,y(3:4))
lamda_derivs = coeff_1*grad_theta + coeff_2*grad_theta_dot;
sum_S = sum(0.5.*[f1 f2]'.*abs(sin_diffs));
candidate_angles = zeros(8,1);
candidate_angles(1) = atan2(y(4) - sum_S*C, y(3) + sum_S*S);
candidate_angles(2) = atan2(y(4) + sum_S*C, y(3) - sum_S*S);
candidate_angles(3) = atan2(-y(4) + sum_S*C, -y(3) - sum_S*S);
candidate_angles(4) = atan2(-y(4) - sum_S*C, -y(3) + sum_S*S);
candidate_angles(5) = atan2(-sum_S*C, sum_S*S);
candidate_angles(6) = atan2(sum_S*C, -sum_S*S);
if abs(norm1/speed*([-S C]*dvdt + beta1_dot)) > 1
    H_values = zeros(6,1);
    for i = 1:6
%        H_values(i) = speed*[y(3) y(4)]*[cos(candidate_angles(i)) sin(candidate_angles(i))]' - ...
%        sum_S*abs(speed*[-S C]*[cos(candidate_angles(i)) sin(candidate_angles(i))]' - ...
%        [-S C]*dvdt - beta1_dot);
%        H_values(i) = - ...
%        sum_S*abs(speed*[-S C]*[cos(candidate_angles(i)) sin(candidate_angles(i))]' - ...
%        [-S C]*dvdt - beta1_dot);
    end
%    angle1 = candidate_angles(min(find((max(H_values)==H_values))));
    angle1 = candidate_angles(4);
else % here receiver speed is greater than the local speed of the optimal zero-variation target V
            U = asin(norm1/speed*([-S C]*dvdt + beta1_dot));
                if U >= 0
    candidate_angles(7) = theta + U;
    candidate_angles(8) = theta + pi - U;
        else % U < 0
    candidate_angles(7) = theta + U;
    candidate_angles(8) = theta - pi - U;
            end
    H_values = zeros(8,1);
                for i = 1 : 8
%        H_values(i) = speed*[y(3) y(4)]*[cos(candidate_angles(i)) sin(candidate_angles(i))]' - ...
%        sum_S*abs(speed*[-S C]*[cos(candidate_angles(i)) sin(candidate_angles(i))]' - ...
%        [-S C]*dvdt - beta1_dot);
        H_values(i) = - ...
        sum_S*abs(speed*[-S C]*[cos(candidate_angles(i)) sin(candidate_angles(i))]' - ...
        [-S C]*dvdt - beta1_dot);
                end
    angle1 = candidate_angles(min(find(max(H_values)==H_values)));
end
% resolve ambiguity in the direction of the heading based on the scenario geometry
if angle1 < -pi/2
    angle1 = angle1 + pi;
elseif angle1 > pi/2
    angle1 = angle1 - pi;
end
efty = [ speed*cos(y(5)); ...
speed*sin(y(5)); ...
lamda_derivs(1); ...
lamda_derivs(2); ...
angle1 ];
```

Thus, it is seen that a system and method of optimizing a synthetic aperture radar image is provided. It will be understood that many additional changes in the details and steps that have been herein described and illustrated to explain the nature of the Optimal SAR Receiver Path algorithm, may be made by those skilled in the art within the principal and scope as expressed in the appended claims. That is, one skilled in the art will appreciate that the Optimal SAR Receiver Path algorithm can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice aspects of the Optimal SAR Receiver Path algorithm as well. While the Optimal SAR Receiver Path algorithm has been described in conjunction with specific embodiments, it is evident that many alternatives, modifications, permutations and variations will become apparent to those of ordinary skill in the art in light of the foregoing description. Accordingly, it is intended that the Optimal SAR Receiver Path algorithm embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of determining a radar receiver path, comprising the steps of:

obtaining a position of a transmitter;

obtaining a position and velocity of a target;

obtaining a position and velocity of a radar receiver;

determining a transmitter aspect angle gradient, a transmitter aspect angle time derivative and a transmitter co-state vector time derivative;

determining a SAR receiver aspect angle gradient, a SAR receiver aspect angle time derivative and a SAR receiver co-state vector time derivative generating a radar platform heading variable, and a group of differential variables over a defined time span;

inputting the group of differential variables into a differential equation solver;

generating a group of possible headings for the radar receiver path; and finding an optimum radar receiver heading from the group of possible headings.

2. The method of claim 1, where the transmitter aspect angle comprises a relative angle between a path of the transmitter and a path of the target.

3. The method of claim 1, where the transmitter aspect angle gradient comprises a rate of change of a relative angle between a path of the transmitter and a path of the target.

4. The method of claim 1, where the transmitter aspect angle time derivative comprises a constituent of a derivative with respect to time of a Hamiltonian co-state vector, where the evolution of the Hamiltonian co-state vector is driven by a first-order differential equation.

5. The method of claim 1, where the radar receiver aspect angle comprises a relative angle between a path of the target and a path of the radar receiver.

6. The method of claim 1, where the target aspect angle gradient comprises a rate of change of a relative angle between a path of the target and a path of the radar receiver.

7. The method of claim 1, where the radar receiver aspect angle time derivative comprises a constituent of a derivative with respect to time of a Hamiltonian state vector, where the evolution of the Hamiltonian state vector is driven by a first-order differential equation.

8. The method of claim 1, where the group of differential variables over a defined time span comprises a group of time derivatives derived from data selected from the group consisting of: a time duration of data collection; a radar receiver speed and heading at a beginning of data collection; a radar receiver position at a beginning of data collection; and a radar receiver co-state vector.

9. The method of claim 1, where the optimum radar receiver heading comprises a radar receiver path that generates a highest quality radar image.

10. The method of claim 9, where the highest quality radar image comprises a highest quality radar image obtainable from optimized transmitter and radar positions.

11. The method of claim 1, where the transmitter is selected from the group consisting of: a commercial radio frequency transmission; a television transmission; and a radar emission.

12. The method of claim 11, where the radar receiver may be selected from the group consisting of: an unmanned aerial vehicle; and a manned aircraft.

13. The method of claim 12, where the radar receiver operates as part of a multistatic synthetic aperture radar.

14. A computer program product for determining a radar receiver path, the computer program product embodied on one or more computer-usable media and comprising:

computer readable program code means for obtaining a transmitter position;

computer readable program code means for obtaining a target position and velocity;

computer readable program code means for obtaining a radar receiver position and velocity;

computer readable program code means for determining a transmitter aspect angle gradient, a transmitter aspect angle time derivative and a transmitter co-state vector time derivative;

computer readable program code means for determining a target aspect angle gradient, a target aspect angle time derivative and a target co-state vector time derivative;

computer readable program code means for generating a radar platform heading variable, and a group of differential variables over a defined time span;

computer readable program code means for inputting the group of differential variables into a differential equation solver;

computer readable program code means for receiving a group of possible headings for the radar receiver path; and computer readable program code means for finding an optimum radar receiver path from the group of possible headings.

15. The computer program product of claim 14, where the transmitter aspect angle comprises a relative angle between a path of the transmitter and a path of the radar receiver.

16. The computer program product of claim 14, where the transmitter aspect angle gradient comprises a rate of change of a relative angle between a path of the transmitter and a path of the radar receiver.

17. The computer program product of claim 14, where the transmitter aspect angle time derivative comprises a derivative with respect to time of a Hamiltonian state vector, where the Hamiltonian state vector comprises a first-order differential equation.

18. The computer program product of claim 14, where the target aspect angle comprises a relative angle between a path of the target and a path of the radar receiver.

19. The computer program product of claim 14, where the target aspect angle gradient comprises a rate of change of a relative angle between a path of the target and a path of the radar receiver.

20. The computer program product of claim 14, where the target aspect angle time derivative comprises a derivative with respect to time of a Hamiltonian state vector, where the Hamiltonian state vector comprises a first-order differential equation.

21. The computer program product of claim 14, where the group of differential variables over a defined time span comprises a group of time derivatives derived from data selected from the group consisting of: a time duration of data collection; a radar receiver speed and heading at a beginning of data collection; a radar receiver position at a beginning of data collection; and a radar receiver co-state vector.

* * * * *